United States Patent [19]
Mead

[11] Patent Number: 5,361,092
[45] Date of Patent: Nov. 1, 1994

[54] METHOD OF AND APPARATUS FOR SCANNING CINEMATOGRAPHIC FILM WHILE AVOIDING BLEMISHES IN THE PHOSPHOR FACE OF A CRT SCANNER

[75] Inventor: Terence W. Mead, Herts, United Kingdom

[73] Assignee: Rank Cintel Limited, United Kingdom

[21] Appl. No.: 977,229

[22] Filed: Nov. 16, 1992

[30] Foreign Application Priority Data

May 20, 1992 [GB] United Kingdom ............... 9210758

[51] Int. Cl.$^5$ ............................................. H04N 3/38
[52] U.S. Cl. ............................... 348/100; 348/103
[58] Field of Search .................. 358/214, 216, 217, 54, 358/348; 348/100, 103, 325; H04N 3/38

[56] References Cited
U.S. PATENT DOCUMENTS
3,953,671  4/1976  Millward ............................ 358/217

FOREIGN PATENT DOCUMENTS
0281229  9/1988  European Pat. Off. ....... H04N 3/36
2203611  10/1988  United Kingdom .
2229885  10/1990  United Kingdom .

Primary Examiner—Yon J. Couso
Assistant Examiner—Wendy R. Greening
Attorney, Agent, or Firm—Ostrolenk, Faber, Gerb & Soffen

[57] ABSTRACT

To avoid the effect of blemishes in a CRT phosphor of a CRT film scanner a map is produced identifying areas of the phosphor that are blemished. When a line scan traverses a blemish the signal produced by that scan is inhibited and the area of film is rescanned with the film in a different position relative to the scanner.

13 Claims, 4 Drawing Sheets

LINES SCAN FROM TOP TO BOTTOM OF FILM

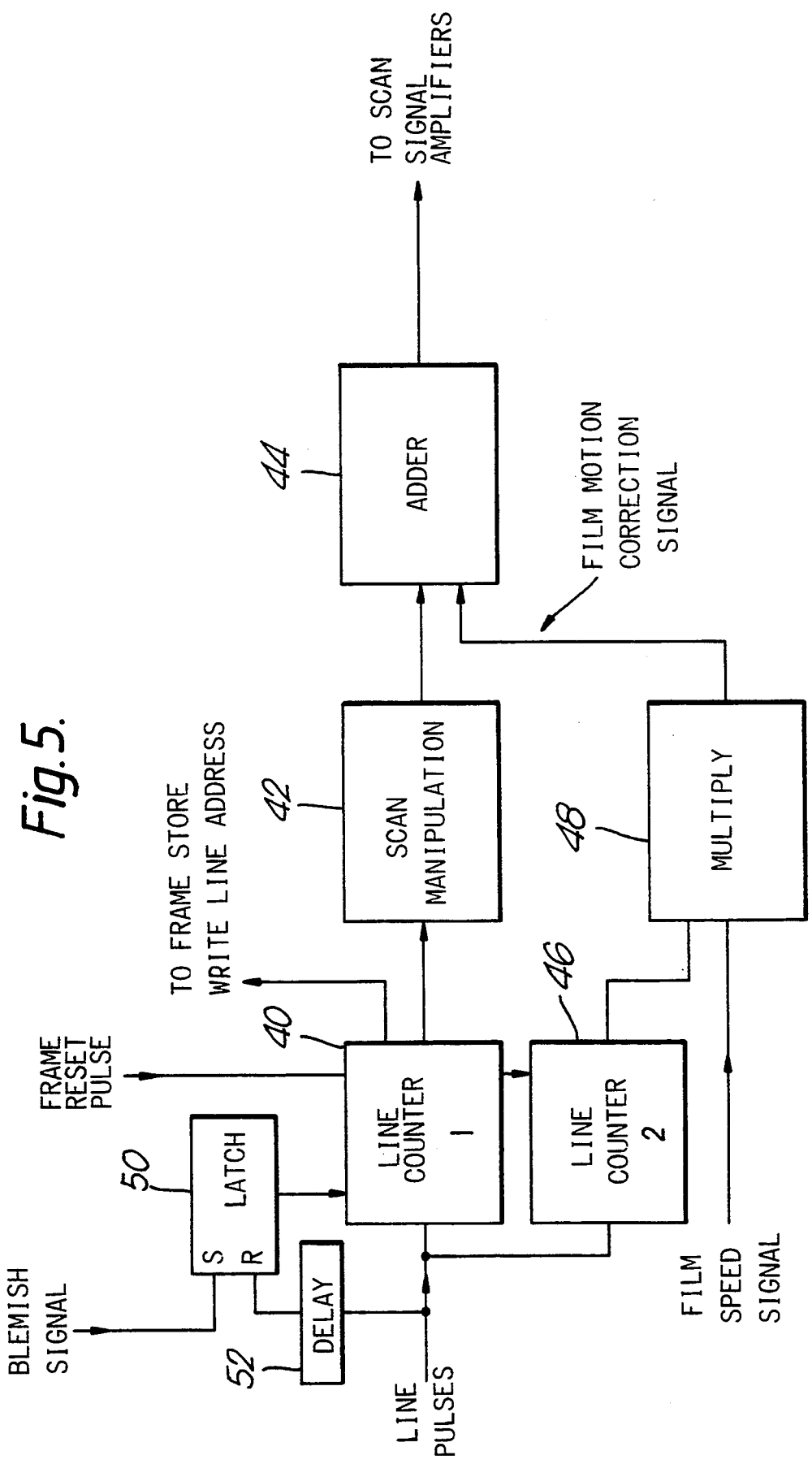

METHOD OF AND APPARATUS FOR SCANNING CINEMATOGRAPHIC FILM WHILE AVOIDING BLEMISHES IN THE PHOSPHOR FACE OF A CRT SCANNER

FIELD OF THE INVENTION

This invention relates to cathode ray tubes film scanners and in particular to the avoidance of the effects of blemishes in the CRT phosphor layer. The invention is particularly applicable to apparatus which uses a CRT to convert between images stored on film and images represented by video signals, such as flying spot telecines and film writers.

BACKGROUND OF THE INVENTION

In a flying spot telecine the film is scanned by light from a cathode ray tube. This cathode ray tube produces the raster or scanning light spot on a layer of phosphor. There often occur very small blemishes in this phosphor caused, for example, by foreign particles, missing phosphor, or separation of the phosphor layer. These blemishes result in degraded performance of the telecine by causing black spots to appear on the television picture (these will appear white when negative film is being used).

Various means have been used to minimize this difficulty. The first step is selection of the cathode ray tubes after their manufacture, which is a very expensive solution. Another technique, using a burn correction system, is to pick up the light directly from the phosphor (before the film) and to use this signal to increase an amplifier gain during the time at which the blemish is scanned. This technique is not satisfactory as it is quite difficult to match precisely the signals produced by the blemish which results in some residual visible blemish. Dirt in the path of the blemish detector can cause additional problems. It has also been suggested in GB-A-2229885 to map the locations of these blemishes and to cause the signal from those locations to be replaced with nearby video information. This also leaves visible defects in the picture area.

SUMMARY OF THE INVENTION

The invention aims to overcome or alleviate the abovementioned disadvantages and to provide an improved blemish avoidance system.

In its broadest form, the invention identifies blemished areas of the CRT scan patch and then ignores line scans which traverse blemished areas. Instead, the area of film which would have been scanned at the scan line containing the blemish is scanned at a different time, at which it has moved relative to the scan patch enabling it to be scanned at a different scan location.

More specifically the invention is defined by the claims to which reference should be made.

Embodiments of the invention have the advantage that no film information is lost due to CRT blemishes as the position of the scan is moved to ensure that parts of the film are scanned. This contrasts with interpolation type solutions such as that proposed in GB 2229885.

Embodiments of the invention have the further advantage that the criteria applied to CRT selection need not be so stringent, improving manufacturing yield.

DESCRIPTION OF DRAWINGS

FIG. 5 is a schematic block diagram showing, in simplified form, the vertical scan circuits of a film scanner embodying the invention.

DESCRIPTION OF BEST MODE

Figure 1:
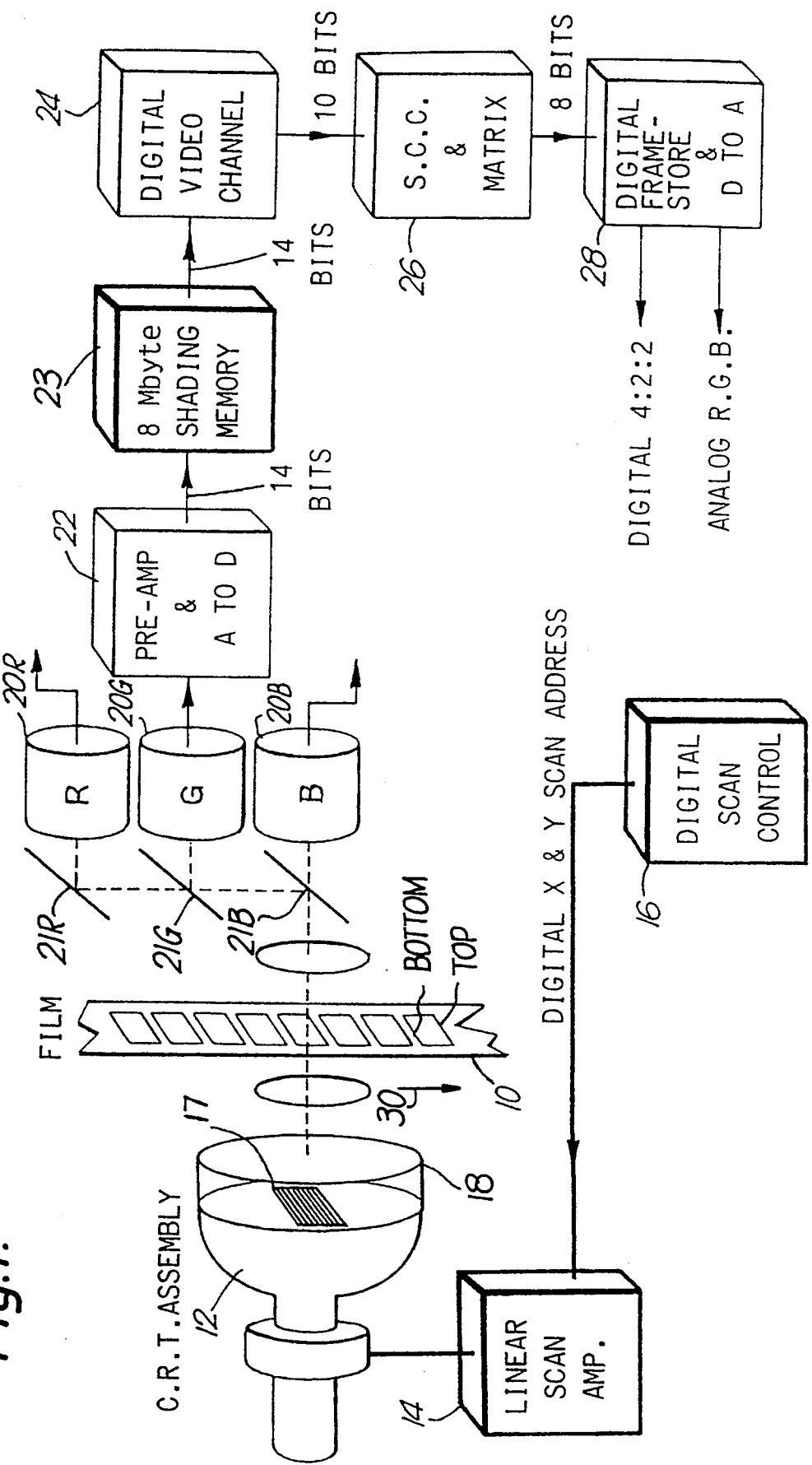
FIG. 1 is a schematic block diagram of a telecine.

The telecine of FIG. 1 is a conventional digital continuous motion flying spot telecine, for example that manufactured by Rank Cintel Limited of Ware, Hertfordshire, England under the trade mark URSA.

Images stored on film 10 are scanned by the flying spot of CRT assembly 12 under the control of digital scan control 16 amplified by linear scan amplifier 14 in known manner.

The scan control 16 produces a series of X and Y scan addresses which the scan amplifier converts into voltages for application to the X and Y deflection coils of the CRT. The flying spot forms a scan patch 17 on the phosphor layer on the inside of the faceplate 18. The size and shape of the scan patch may vary depending on the speed of the film 10 through the film gate, the need to produce scanning effects and various other factors.

Light transmitted by the film is collected by photomultipliers 20R, 20G, 20B via corresponding dichroic mirrors 21. The photomultipliers each produce an analog signal corresponding to one of the three primary colors Red, Green and Blue. These signals are amplified and converted into digital signals by A to D convertor 22 and processed as 14 bit signals first by shading memory 23, which compensates for lack of uniformity of response of the phosphor grains, and then in a digital video channel 24 which applies a number of corrections to the signal such as gamma correction, color correction, etc, in known manner.

The 10 bit output from the channel 24 is applied to a secondary color corrector 26 and then in 8 bit form to a digital frame store 28 for conversion from a sequential to an interlaced signal for output as a digital 4:2:2 signal and further applied to a digital to analog convertor for output as an analog R.G.B. signal.

The film scanner part of the telecine is a continuous motion device which means that the film is moving (in the direction of arrow 30) past the scanner while it is being scanned. Scanning is from top to bottom of the film frames. However, the images are effectively upside down as they pass through the film gate so that the scanner scans against the direction of movement of the film.

If the film is moving at a speed exactly equal to the scan rate, the CRT will simply scan the same line of the patch 17 repeatedly. However, to avoid burn, the CRT scan is usually driven faster than the required film speed so that a small vertical scan component is introduced (in the direction of arrow 30) to ensure that the scan 'keeps-up' with the film.

Figure 2:
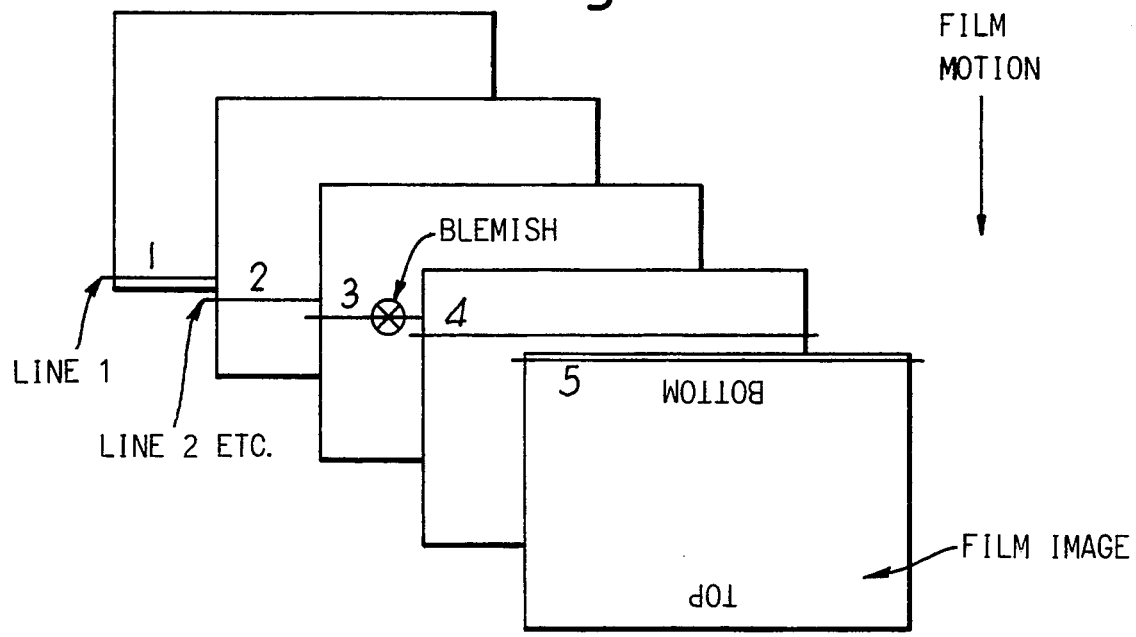
FIG. 2 is a schematic diagram showing the position of scan lines in a continuous motion telecine having an inverted scan.

Turning now to FIG. 2, a simple five line scan is shown for the case where a small inverted vertical scan is required. It will be seen that each of the scan lines 2 to 5 are at a slightly lower vertical position with respect to the previous line. Scan line 3 traverses a blemish on the CRT face, and as a result the output video signal will not be a true representation of the film frame area scanned by that line.

Figure 3:
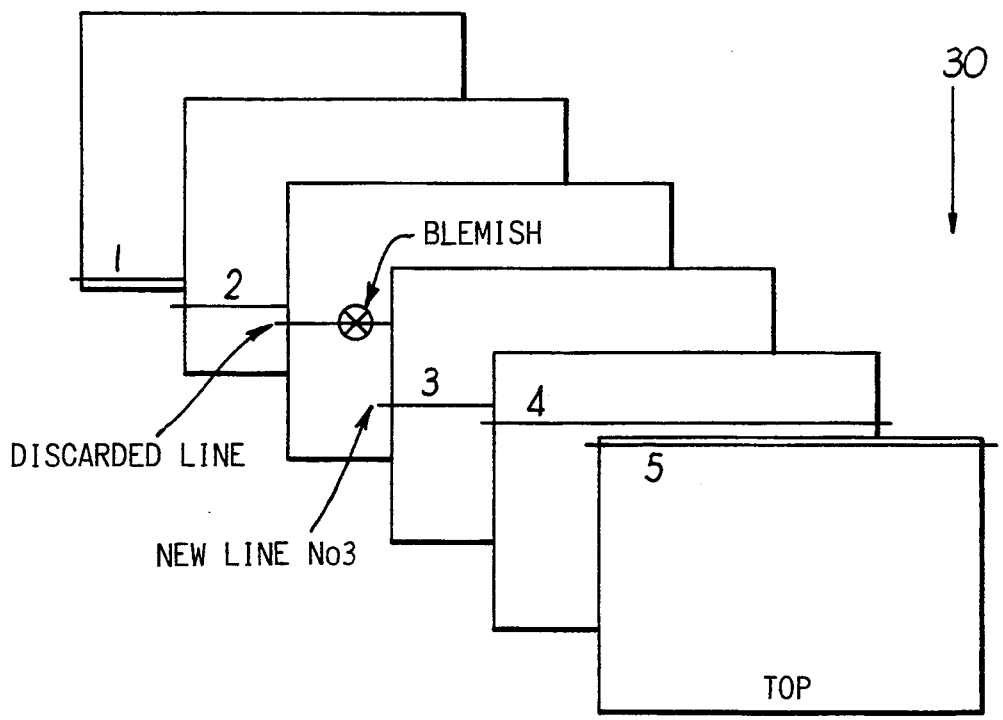
FIG. 3 shows how the scan lines of FIG. 2 are modified in an embodiment of the invention.

FIG. 3 shows how this problem may be avoided. Scan line 3 which includes the blemish is discarded and the area of film corresponding to that scan line is rescanned on the next scan line. However, as the film is moving past the scanner, the area to be scanned is in a different position so that the scan line no longer contains the blemish. The overall scanning pattern contains one extra scan line. Provided that the number of repeated lines is restricted there is adequate time to scan the whole frame. However, the required scan time will impose a constraint on the quality of the CRT which is acceptable.

Figure 4:
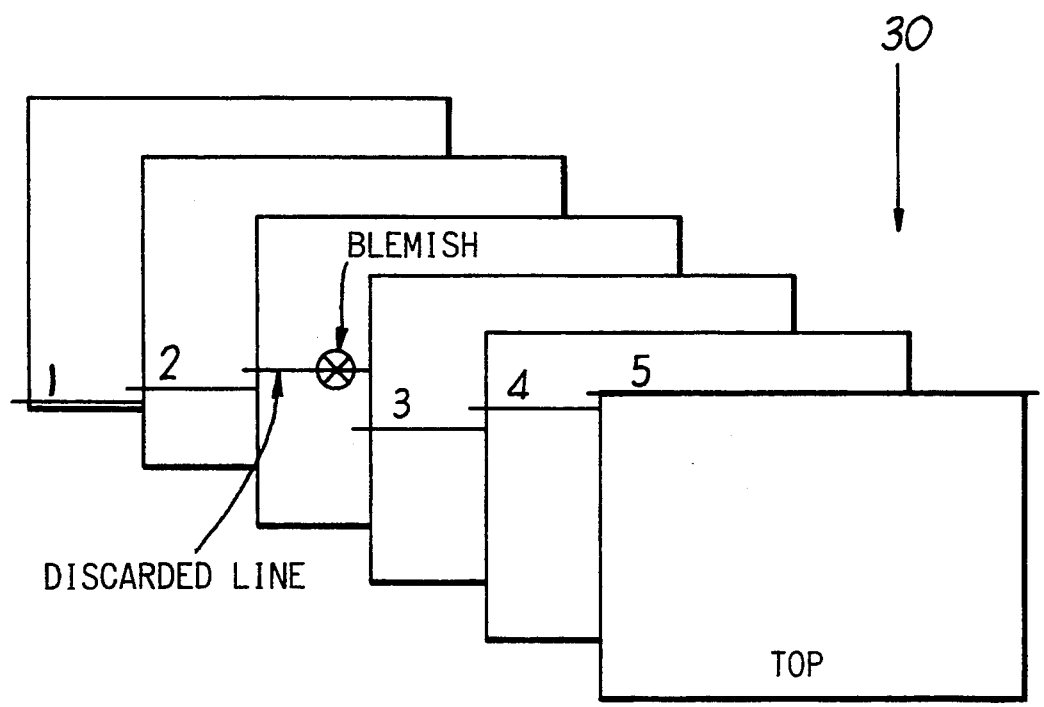
FIG. 4 shows how the modification of FIG. 3 is applied when the vertical scan is in an opposite sense to that of FIG. 2.

FIG. 4 shows the situation where the film speed is slightly slower than scan speed introducing a positive vertical scan component, in other words the scan is actually moved in an opposite direction to the direction of movement of the film shown by arrow 30. The blemish is avoided as before. However, the scan soon returns to the same area of the phosphor as the direction of the vertical scan component is opposite to that of film movement. In FIG. 4, the blemished line would be rescanned at line 6 and another line would need to be repeated. This could require a substantial number of discarded and repeated lines which might not be possible in the time required to scan the film frame.

This possibility might be avoided by decreasing the line frequency as discussed in GB 1535563, although in a different context. Line frequency may be decreased conveniently by increasing the horizontal blanking periods in accordance with film speed to maintain a small inverted vertical scan. The blemish avoidance can then function as described with respect to FIGS. 2 and 3.

To ensure that an inverted vertical scan is always present, the film could be scanned from bottom to top and inverted using a frame store which would read out lines in the opposite order from that in which they were stored.

FIG. 5 shows the vertical scan generating circuitry of block 16 in FIG. 1 in more detail. The required effect is achieved by causing the scan counter to hold for the appropriate line(s). The line pulses cause a first line counter 40 to increment every line, to produce a vertical rate ramp signal. This signal is modified by the scan manipulation block 42 which produces XY Zoom and scan effects. Finally, adder 44 adds the scan signal to a film motion correction signal which compensates for the movement of the film through the film gate and passes it on to the scan signal amplifiers 14 (FIG. 1). The film motion correction signal is produced by a second line counter 46 which similarly provides a vertical ramp. The amplitude of this ramp is adjusted according to the film speed by the multiply block 48. The first line counter 40 is prevented from counting whenever the previous line has crossed a blemish location, so that the previous line address is repeated. The film will have moved to a different location in the meantime and the film motion correction signal will have changed to compensate for that movement so that the new scan will not cross the blemished location. The first line counter also provides an output signal to the frame-store which is used to generate the line address when writing data into the store. This address will be repeated whenever a blemished line is encountered ensuring that defective data is overwritten in the store.

The means of locating the blemish is closely related to the automatic shading circuits disclosed in GB-A-2229885, the contents of which are incorporated herein by reference in their entirety. Before use the telecine is switched into an automatic alignment mode which causes the scan to explore the used area of the cathode ray tube phosphor screen in response to a sequence of digital scan addresses. Since the film is removed for this process the video signal will represent the light from the phosphor at each location and these values are stored in a memory circuit for subsequent use in correcting the shading of the system. A blemish on the phosphor will cause an unusual drop in the light level and any location containing such a blemish will have a flag set in the memory map. The size of each location used by the memory map is about equivalent to a picture pixel, however some blemishes are smaller than this and might be overlooked. To avoid such errors in detection of blemishes several scans are performed and the scan locations are moved by sub pixel dimensions for each scan so that very small blemishes will be found. The method of blemish detection so far described is disclosed in GB-A-2229885. Whenever the scan subsequently crosses a location which is flagged as being blemished a signal is produced which sets the latch 50 in FIG. 5 this latch inhibits the count of line count 1 at the next line pulse, and the latch is then reset via a delay 52 so that subsequent line pulses are enabled.

In a second embodiment of the invention an additional photosensing device is positioned before the film such that it has a direct view of the cathode ray tube phosphor. This sensor produces a video signal which will substantially reduce in level whenever the scanning beam crosses a blemish. This signal is applied to a lever detector and stored in a one bit frame store using an automatic alignment mode as previously described. During normal operation the blemish signal from this one bit frame store sets the latch 50 as described earlier. Alternatively the output of the level detector may be used directly to set the latch 50. This second embodiment does not use the shading memory or video circuits of the telecine.

The first embodiment described relates purely to telecine use. However, the second embodiment may equally be applied to film writing apparatus in which the CRT spot is modulated by video signals to expose film. In the case where an inverted scan is used with a film writer it is necessary to provide a frame store in the path of the video signal which feeds the CRT grid/cathode to modulate the beam. As a result, the CRT would start scanning at the bottom of the image permitting the scans to be inverted.

I claim:

1. A method of scanning film with a cathode ray tube (CRT) film scanner having a phosphor face and operable to produce a scan for scanning said film, the scanner having an associated film drive for moving the film past said scanner during scanning, the method comprising the steps of:

identifying areas of the CRT phosphor face containing blemishes;

scanning the film with a series of line scans transversing respective portions of the CRT phosphor face;

discarding line scans which traverse areas of the CRT phosphor face identified as blemished; and rescanning the area of film previously scanned by a discarded line scan with a new line scan which is moved relative to the discarded line scan.

2. A method according to claim 1, wherein said steps of scanning and rescanning each comprise scanning the film with a vertical scan component opposite in sense to the direction of movement of the film, the method further comprising:

decreasing the line frequency of scans to convert said vertical scan component into an inverted vertical scan component.

3. A method according to claim 1, wherein said steps of scanning and rescanning each comprise scanning the film with a vertical scan component opposite in sense to the direction of movement of the film, the method further comprising:

scanning the film from the bottom of the image to the top of the image to produce a scanned image;

storing the scanned image in a storage means and reading the scanned image from the storage means in reverse order from that in which it was stored.

4. A method according to claim 1, comprising the step of inhibiting a counter controlling the vertical scan position when a scan line is identified as traversing a blemished area.

5. A method according to claim 1, wherein said new scan line does not traverse the blemished areas of the phosphor face.

6. Apparatus for scanning film, comprising:

a cathode ray tube (CRT) scanner having a phosphor face for scanning a film with a series of line scans traversing respective areas of the phosphor face;

drive means for moving the film past the scanner during scanning;

means for identifying areas of the phosphor face containing blemishes;

means for discarding line scans which traverse areas of the phosphor face identified as blemished; and means for rescanning the area of film scanned by discarded line scans with a new scan line which is moved relative to the discarded scan line.

7. Apparatus according to claim 6, wherein the CRT scanner comprises means for scanning film frames with a vertical scan component opposite in sense to the direction of movement of the film; the apparatus further comprising:

means for decreasing the line frequency of scans to convert the vertical scan component into an inverted scan component.

8. Apparatus according to claim 6 wherein the CRT scanner comprises means for scanning film frames with a vertical scan component opposite in sense to the direction of movement of the film; the apparatus further comprising:

means for scanning the film from the bottom to the top of images exposed thereon;

storage means for storing the scanned image; and means for reading the scanned image from the storage means in reverse order from that in which it was stored.

9. Apparatus according to claim 6, comprising:

a counter for incrementing a control signal controlling the vertical scan position of the CRT scanner in response to line pulses; and means for inhibiting the counter on identification of a line scan as blemished.

10. Apparatus according to claim 9, wherein the means for moving the scan comprises:

means for multiplying a measure of film speed with a measure of vertical scan height to produce a motion correction signal; and means for applying the motion correction signal to flying spot deflection means of the CRT.

11. A telecine comprising apparatus according to any one of claims 6, 7, 8, 9 or 10.

12. A film writer comprising apparatus according to any one of claims 6, 7, 8, 9 or 10.

13. Apparatus according to claim 6, wherein the means for rescanning the area of the film moves the new scan line to an area of the phosphor face which does not traverse the blemished areas of the phosphor face.

* * * * *